Figure 1:
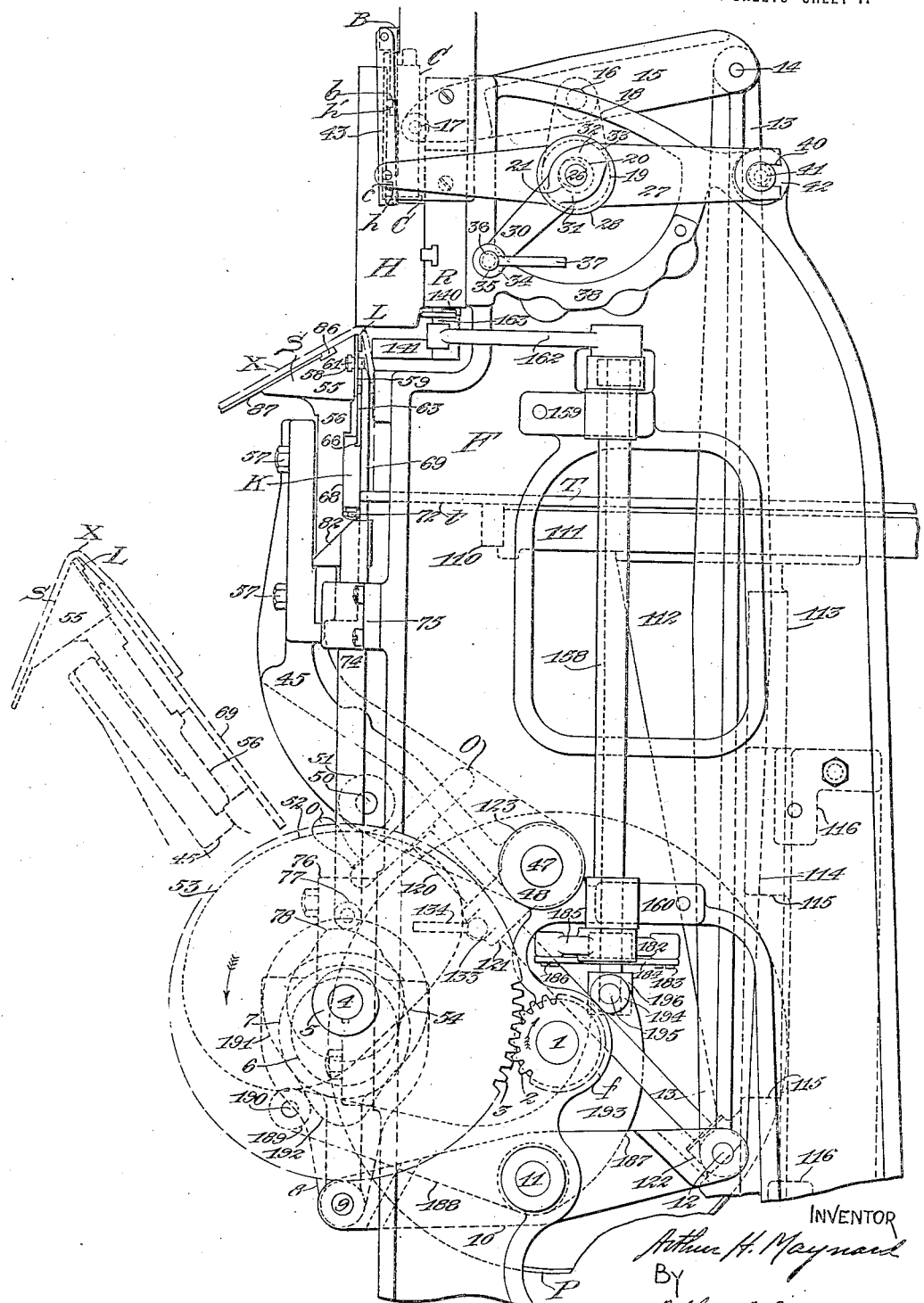

A. H. MAYNARD.
BOOKLET STITCHING MACHINE.
APPLICATION FILED JULY 17, 1918.

1,336,251.

Patented Apr. 6, 1920.
8 SHEETS—SHEET 6.

INVENTOR
Arthur H. Maynard
BY
Arthur R. Armington
ATTORNEY

UNITED STATES PATENT OFFICE.

ARTHUR H. MAYNARD, OF WARWICK, RHODE ISLAND, ASSIGNOR TO BOSTON WIRE STITCHER COMPANY, OF PORTLAND, MAINE, A CORPORATION OF MAINE.

BOOKLET-STITCHING MACHINE.

1,336,251.     Specification of Letters Patent.     Patented Apr. 6, 1920.

Application filed July 17, 1918. Serial No. 245,310.

*To all whom it may concern:*

Be it known that I, ARTHUR H. MAYNARD, a citizen of the United States, residing at Warwick, in the county of Kent, State of Rhode Island, have invented certain new and useful Improvements in Booklet-Stitching Machines, of which the following is a specification.

My invention is an improved wire-stitching or stapling machine for stitching together groups of pages in binding circulars, booklets, pamphlets and the like. One object of my improvement is to provide in a multiple-head or gang machine, for simultaneously applying a plurality of staples to the work, a single means for adjusting all of the stitcher-mechanisms of the several heads in unison to regulate their action in accordance with the thickness of the stock to be stitched. Another object of the improvement is to render the machine entirely automatic in operation whereby the pages placed on the work-saddle are carried into position beneath the stitcher-heads; the staples applied thereto in predetermined relation; and the stitched booklets removed from the saddle and stacked together in series.

The invention is fully described in the following specification, illustrated by the accompanying drawings, in which like reference characters designate like parts. In the drawings:—

Figure 2:
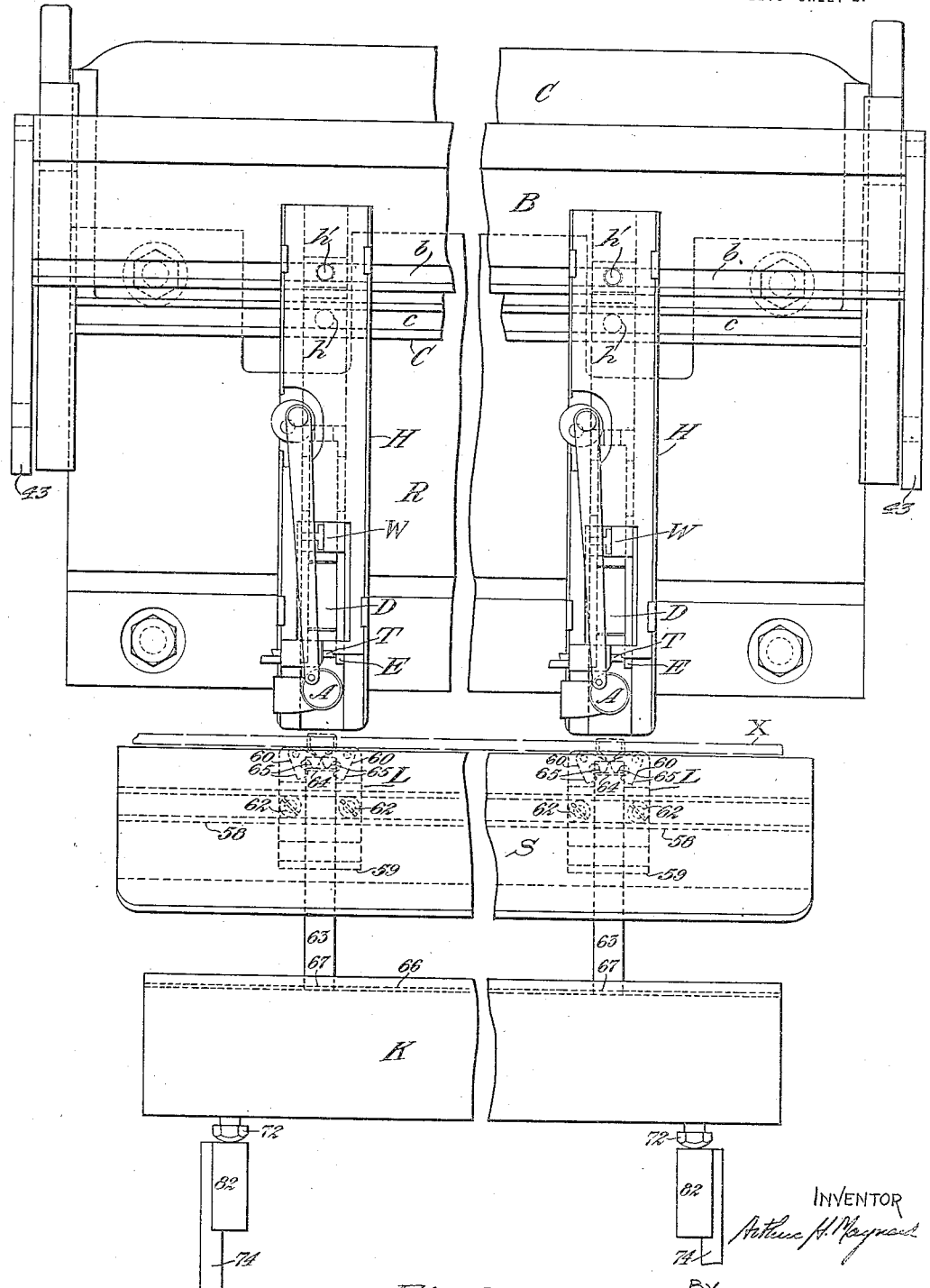
Figure 3:
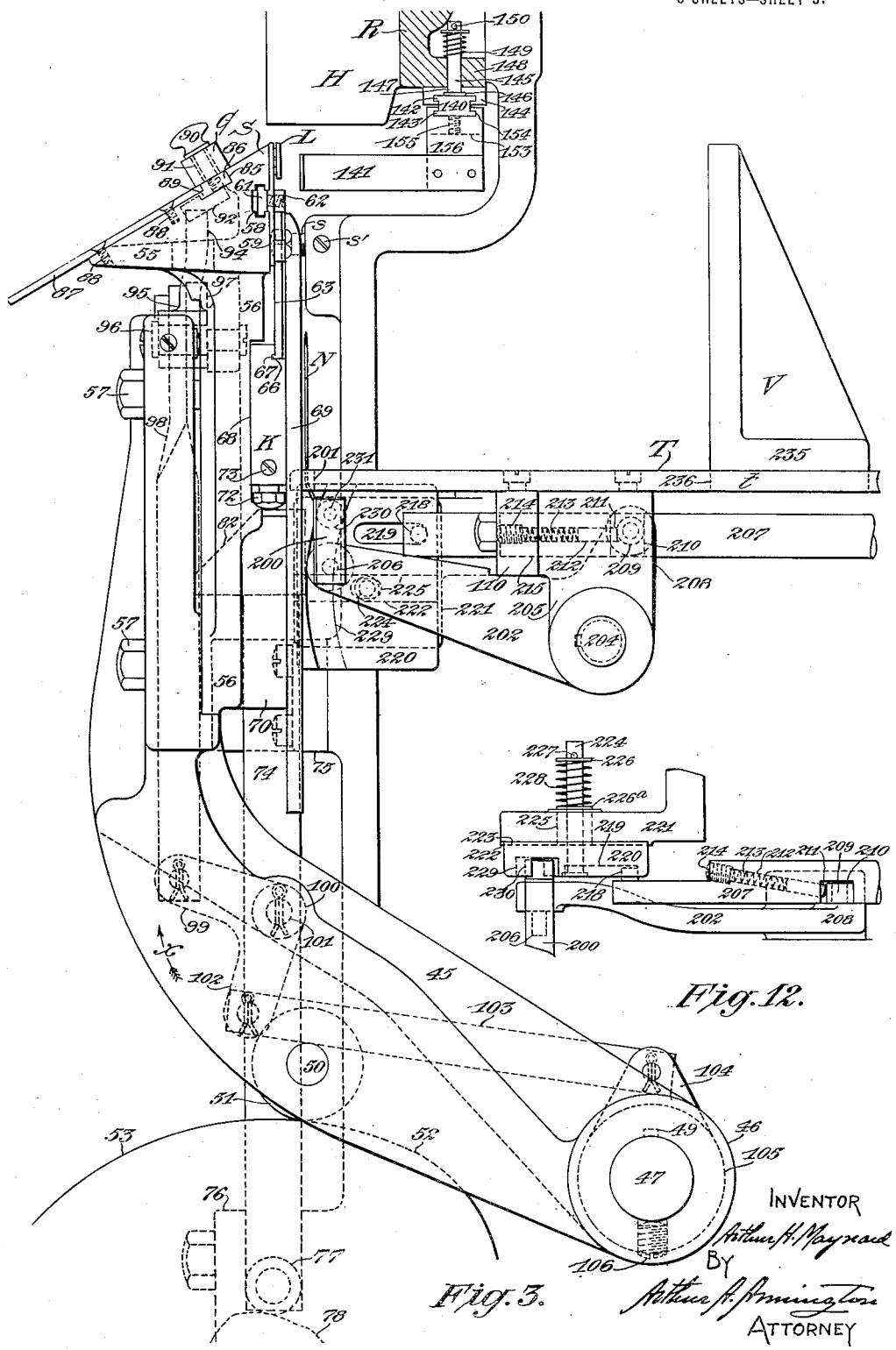
Figure 4:
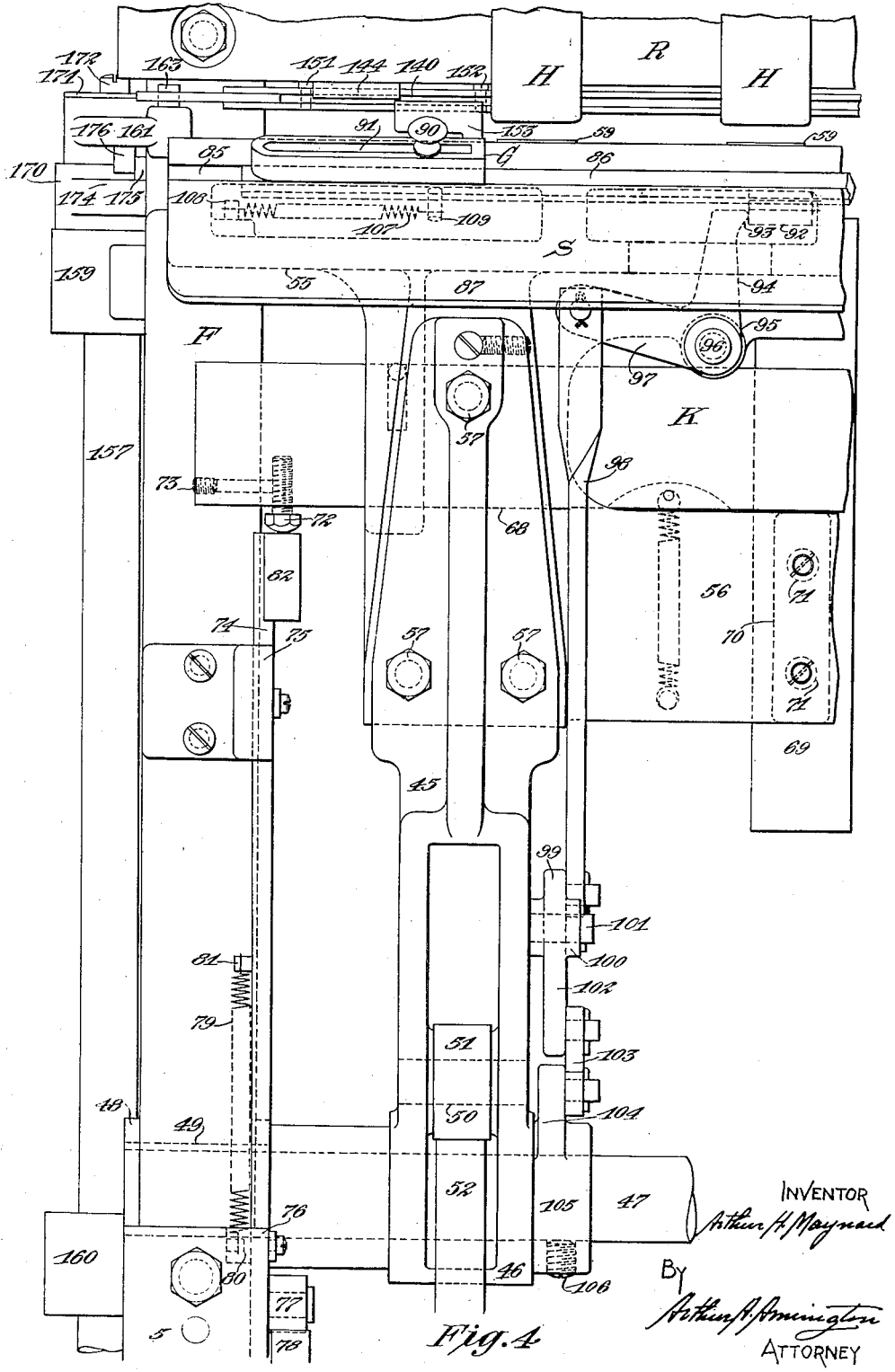
Figure 5:
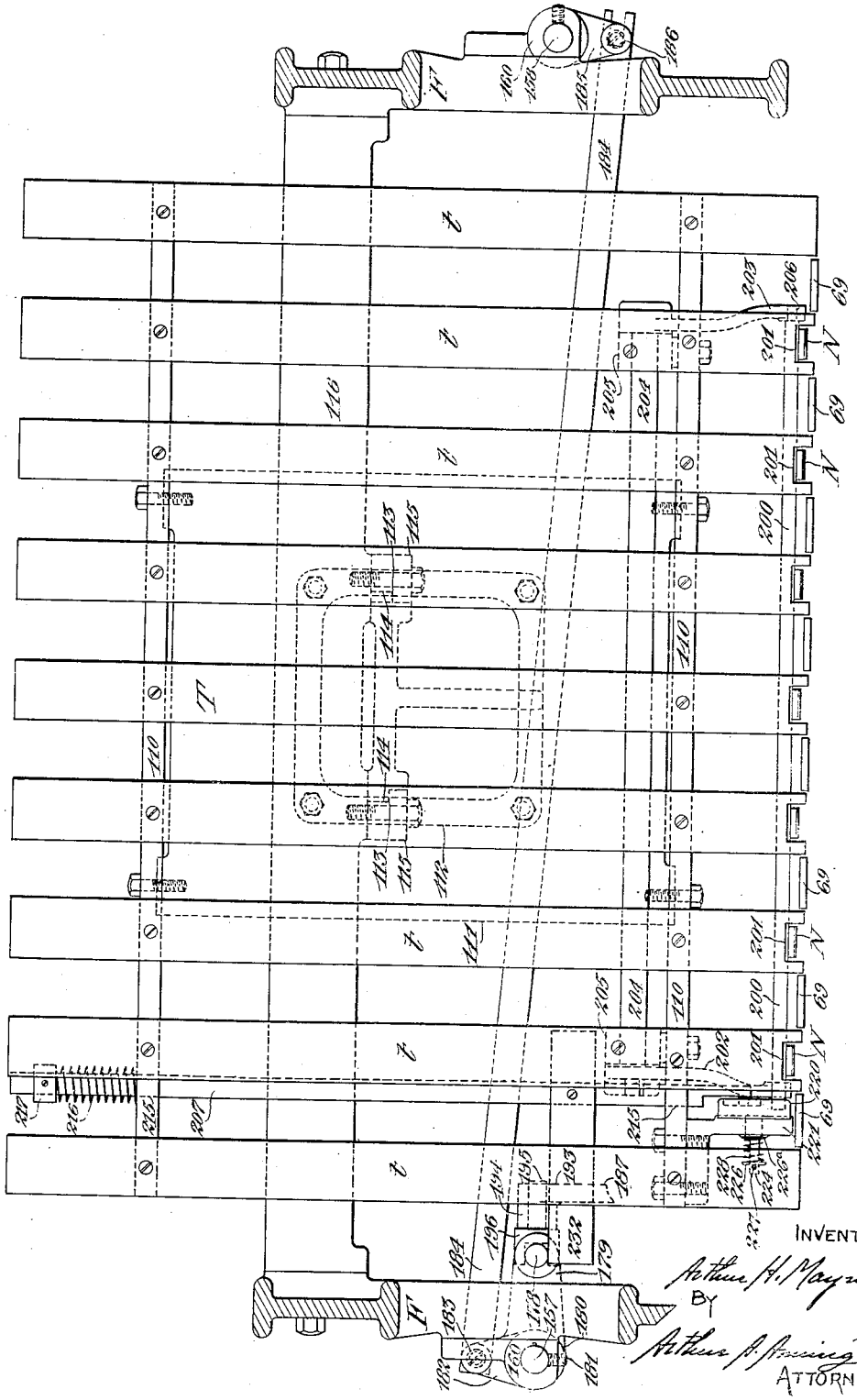
Figure 6:
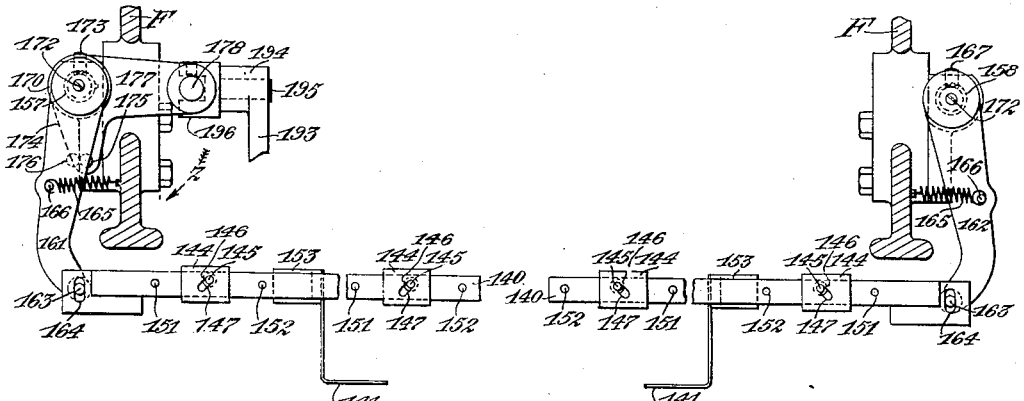
Figure 7:
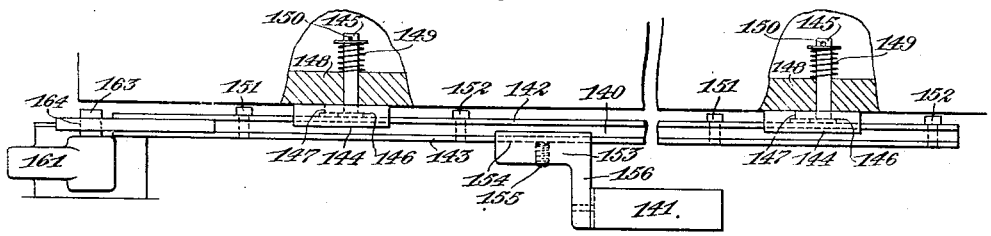
Figures 8, 9:
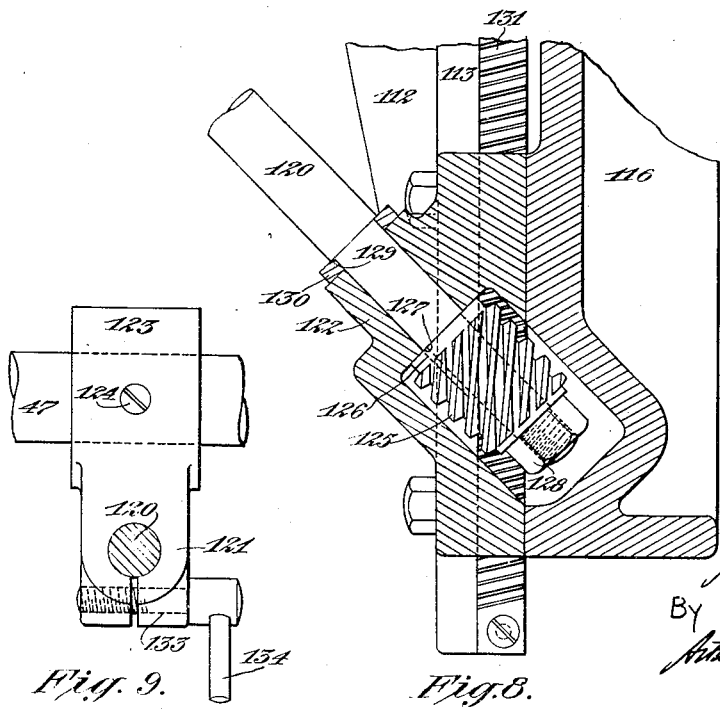
Figures 10, 11:
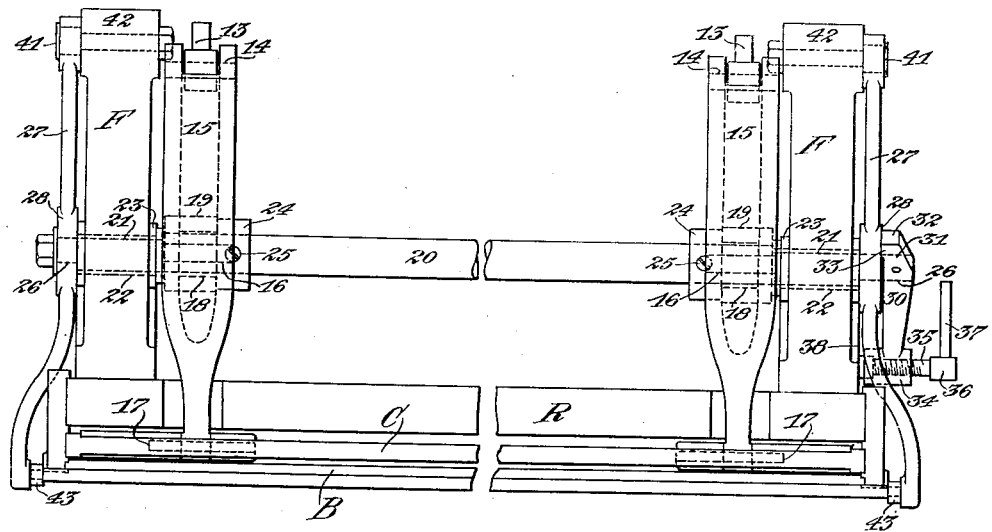
Figure 13:
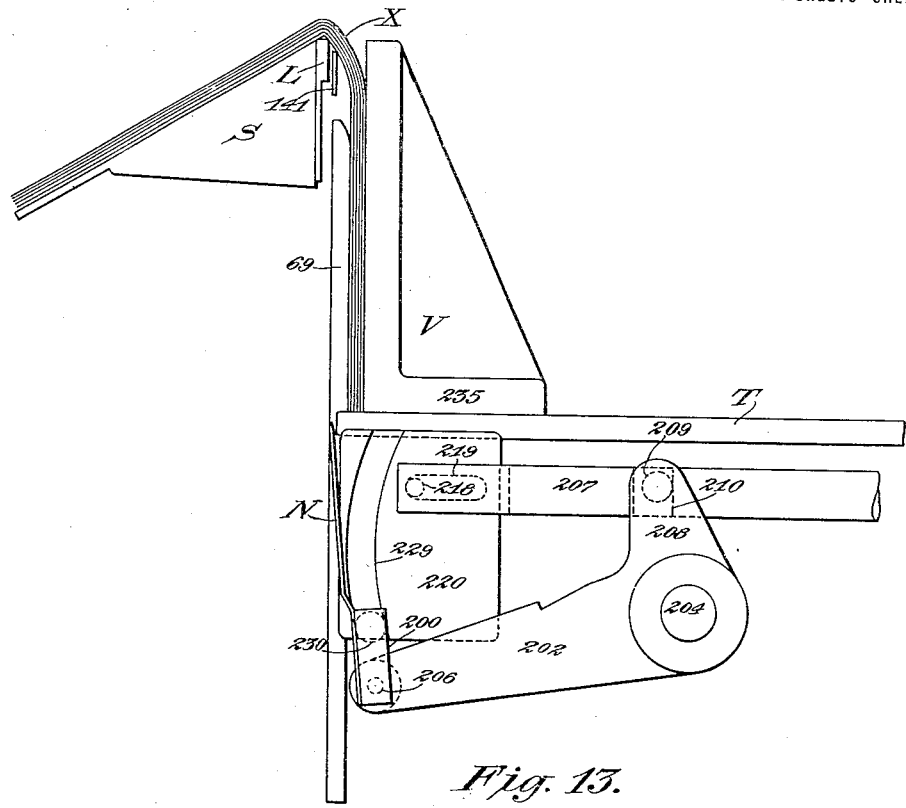
Figure 14:
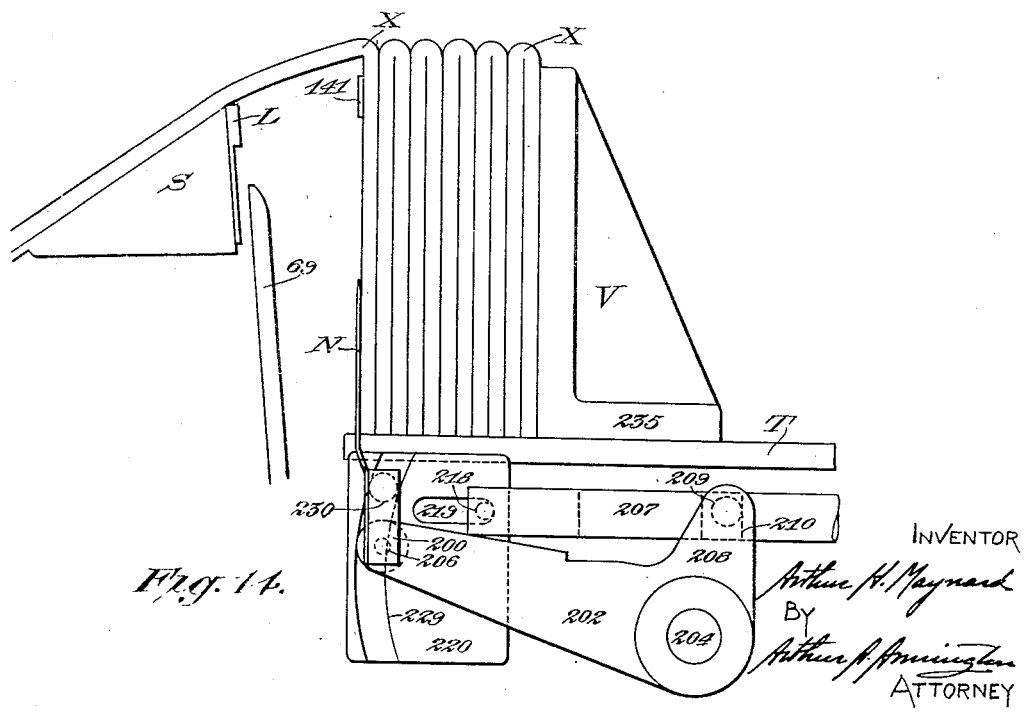

Figure 1 is a side elevation of my improved machine, showing its main operating parts;

Fig. 2, a front view of a portion of the machine in enlarged scale, showing two of the stitcher-heads and their associated clencher-means with which the staple-forming and staple-driving mechanisms coöperate;

Fig. 3, an enlarged, side view of a portion of the machine showing the saddle-operating mechanism and the booklet stacking-devices;

Fig. 4, an enlarged, front elevation of the same;

Fig. 5, a plan view of the stacking-table showing the lower stacking- and retaining-devices in connection with their operating-means;

Fig. 6, a plan view of the upper stacking-fingers and their operating-means;

Fig. 7, an enlarged, front view of a portion of the same;

Fig. 8, an enlarged, detail view of the adjusting-means for the stacking-table;

Fig. 9, an enlarged view of the locking-device for the table-adjusting means;

Fig. 10, a plan view of the adjusting-means for the stitcher-heads;

Fig. 11, a front elevation of the operating-means for the upper stacking-fingers;

Fig. 12, a plan view in detail of the operating-mechanism for the lower stacking-fingers; and Figs. 13 and 14, enlarged, detail views showing the method of operation of the upper and lower stacking-fingers.

The present, improved machine is of the same general type as that shown and described in my U. S. Letters Patent No. 1,252,011, granted Jan. 1, 1918. It comprises essentially a plurality of stitcher-heads arranged in gang form and adapted for lateral adjustment in relation to each other to regulate the point of application of the staples to the work; and also provided with means for simultaneous adjustment of the staple-forming and staple-driving mechanisms in accordance with the thickness of the stock to be stitched. The stitcher-heads may be of any usual construction, and in order that they may be set in close relation to provide for relatively close spacing of the staples, they are preferably of the vertical type such as that shown in U. S. Letters Patent No. 970,461, granted to Thomas A. Briggs, Sep. 20, 1910.

Referring to Figs. 1 and 2 of the present drawings, the stitcher-heads H consist of box-like casings containing the wire-feeding, staple-forming and stapling-driving mechanisms which are vertically reciprocable therein and adapted to be operated in unison from a single element such as the horizontal crosshead C. The stitcher-heads H are attached to a horizontal rail R supported on upright side-frames F extended downwardly in legs which rest on the floor. The crosshead C is slidably mounted at the front of the rail R to adapt it to be vertically reciprocated thereon, and the stitching-mechanisms of the several heads H are connected therewith by means of rearwardly projecting studs $h$ engageable with a longitudinal slot $c$ therein, see Fig. 2. Through this arrangement the separate heads H may be set at different points along the rail R to provide for any desired lateral spacing of the staples while maintaining the connection between the stitching-mechanisms and their operating-means C.

The crosshead C is operated from means located below the heads H between the side-frames F, said operating-means being connected thereto through a novel arrangement of mechanism which provides for simultaneous adjustment of all of the several stitching-mechanisms with relation to the work. Journaled in bearings *f* on the side-frames F is a horizontal drive-shaft 1 which carries the usual driving-element such as the belt-pulley P at one end, see Fig. 1. The shaft 1 is connected by gears 2 and 3 to drive a parallel shaft 4 which, for convenience of description, will be hereinafter called the cam-shaft. The cam-shaft 4 is journaled in bearings 5, bolted to the front of the frames F, and carries two eccentrics 6 keyed to its opposite ends. Each eccentric 6 is encircled with the usual strap 7 extended in the arm 8 which is pivotally connected at 9 to one end of a rocker-lever 10. The lever 10 is pivoted on a rod or shaft 11 extending between the side-frames F and has its counterpart in a corresponding lever at the opposite end of the machine. The inner ends of the rocker-levers 10 are pivotally joined at 12 to connecting-rods 13 which extend vertically upward and are hinged at 14 to the ends of rocker-arms 15. Referring to the plan view, Fig. 10, the rocker-arms 15 are supported on pivots 16 and have their outer ends hingedly connected at 17 to the crosshead C. It will thus be seen that as the shaft 4 is driven from the main drive-shaft 1 the rotation of the eccentrics 6 will impart a rocking motion to the levers 10 which communicate it through the connecting-rods 13 to oscillate the arms 15 in the manner of a walking-beam to reciprocate the crosshead C.

The device for adjusting the range of action of the cross head C, whereby to set the staple-forming and staple-driving mechanisms in accordance with the thickness of the work to be stapled, consists of means for raising or lowering the axis of oscillation of the rocker-arms 15. The rocker-arms 15 are pivoted on pins 16 which project from the side of two arms 18 formed with hubs 19 mounted on a cross-shaft 20 extending horizontally between the side-frames F, see Figs. 1 and 10. At the ends of the shaft 20 are reduced sections 21 formed eccentric to its main axis and fitted to bushings 22 held in bearings 23 on the frames F, so that by turning the shaft the arms 18 are raised or lowered, as the case may be, to regulate the vertical position of the pivots 16 of the rocker-arms 15. It will be understood that the arms 18 are loosely mounted on the shaft 20 and, as shown in Fig. 10, suitable collars 24 secured to the shaft by set-screws 25 hold them in place with their hubs abutting the ends of the bushings 22. The outer ends of the shaft 20 are reduced again at 26 forming extensions projecting beyond the ends of the bushings 22 and having their axes coincident with that of the main portion of the shaft. Mounted on these extending portions 26 of the shaft 20 are two levers 27 formed with hubs 28 which abut the outer ends of the two bushings 22. The purpose of the levers 27 will be described later, suffice it for the present to state that they are raised and lowered for adjustment of the parts connected thereto through the turning of the eccentric portions 21 of the shafts 20 in the bushings 22. Secured fast on the outer end of the extension 26 at the right-hand end of the shaft 20 is a crank-arm 30 which serves as the means for turning the shaft to adjust the position of the parts mounted thereon. The hub 31 of the crank-arm 30 is formed with an extension 32 having an inwardly projecting lug 33 which bears against the outer face of the hub 28 of the right-hand lever 27. At the lower end of the arm 30 is a boss 34 through which is screwed a stud 35, the outer end of said stud having a head 36 from which extends a rod or pin 37. On the side of the frame F is a quadrant 38 arranged concentric with the axis on which the shaft 20 turns, and against the face of which the inner end of the stud 35 bears. By turning the rod 37 the stud 35 can be tightened against the quadrant 38 to hold the crank-arm 30 in its adjusted position, this setting of the stud also serving to bind the lug 33 against the hub 28 of the lever 27 to clamp the latter in position. It will now be seen that by turning the crank-arm 30 around the quadrant 38 the shaft 20 will be rotated to raise or lower the parts mounted eccentric to its axis of rotation. In other words, when the shaft 30 is rotated on the axis of its eccentric bearings, it will effect a vertical adjustment of the arms 18 which support the pivot-pins 16 for the rocker-arms 15, and likewise it will also act to raise or lower the central supports for the levers 27.

Referring still to Figs. 1 and 10, the inner ends of the levers 27 are forked at 40 to engage fixed studs 41 secured in bosses 42 on the frames F. The outer ends of the levers 27 are connected to the adjusting-means which regulates the action of the wire-feeding devices in the several stitcher-heads H. The wire-feed and wire-cutters are indicated at W and T, respectively, in Fig. 2 of the present drawings, but are not herein described or illustrated in detail since they may be of any usual arrangement. The construction and method of operation of these devices are explained in my U. S. Letters Patent No. 1,252,011, previously referred to, and it will be sufficient for an understanding of the operation of the present machine to state that both mechanisms are adjustable from a vertically slidable member, common to all of the several stitcher-heads, to regulate the length of the legs of the staples formed in the machine in accordance with the thickness of the stock to be stapled. The slidable adjusting-member for the wire-feeds and wire-cutters in the present machine is shown in Figs. 1 and 2, and comprises the horizontal rail or bar B. The rail B is adjustable up and down at the front of the fixed rail R through its connection with the forward ends of the levers 27. It will be observed from Figs. 1 and 10 that the levers 27 are connected to the opposite ends of the rail B by links 43. On the front of the rail B is a slot $b$, see Fig. 2, engaged by suitable studs $h'$ carried by the wire-feed and wire-cutter adjusting-means. Referring again to Fig. 1, it will be noted that the studs 41 with which the forked ends 40 of the levers 27 engage are formed with eccentrically disposed bodies. This provides that when the studs are turned in their bosses they will act to raise or lower the rear ends of the levers 27 to effect an initial adjustment in their position. This latter adjusting-means is provided merely for convenience in setting up the machine when its parts are being assembled. That is to say, after the parts of the machine are properly related the studs 41 remain fixed and the adjustment of the levers 27 is secured solely by turning the crank-arm 30 as before described. This action operates to raise or lower the forward ends of both levers 27 and the latter, acting through their links 43, move the slide or rail B vertically to adjust the wire-feed and wire-cutters in accordance with the length of staple required for the work being stitched, this adjustment being in conformity with the adjustment of the staple-forming and driving-devices which is effected simultaneously therewith through the means previously described.

Referring to Fig. 2, E designates the reciprocating staple-former in the head H which coöperates with an anvil A to bend down the legs of the staple from a length of wire fed thereto by the wire-feed W. After the staple has been formed on the anvil the latter is withdrawn from between its legs and the staple-driver D then descends to drive it through the work. The pages of the booklets to be stitched are supported on a triangularly-shaped saddle S, see Fig. 1, with their folded portions lying across its apex in position beneath the staple-drivers D in the several stitcher-heads H. On the forward, vertical side of the saddle S are the clencher devices L which coöperate with the drivers D to bend over the legs of the staples as they are driven down through the work, the coaction of these parts being more fully explained hereinafter. Referring now to the enlarged views, Figs. 3 and 4, the saddle S extends horizontally across the whole width of the machine and is mounted on two pivoted arms 45 to adapt it to swing outwardly from beneath the stitcher-heads H into convenient position for receiving the work to be stitched. It comprises the triangular head-portion 55 formed at the top of a vertical rail or plate 56 to which the arms 45 are secured by means of the bolts 57. The arms 45 are substantially elbow-shaped, as shown in Fig. 3, their lower ends being forked and joined to hubs 46, see Fig. 4, which are rotatably mounted on a cross-shaft 47. The shaft 47 extends horizontally between the side-frames F and is held in bearings 48 thereon, being keyed at 49 to one of them to prevent it from turning. Journaled on pins 50 extending between the forked sides of the arms 45 are rollers 51 adapted to engage with the peripheries of two cams 52 which are keyed to the cam-shaft 4, shown in Fig. 1 and previously referred to. The peripheries of the cams 52 are formed with portions 53 concentric with their axis throughout the greater part of their circumference, while on the opposite sides are relatively flat portions 54. This provides that when the cams 52 are rotated from their shaft 4 the rollers 51, riding over their concentric portions 53, will hold the arms 45 raised to maintain the saddle S beneath the stitcher-heads H during the stitching-operation. As the saddle S comes into this position, as shown in Fig. 3, its head 55 contacts with two stop-screws $s$ on the side-frames F to limit its movement. The screws $s$ are adjustable to regulate the operative position of the saddle in relation to the stitcher-heads and preferably are locked in place by set-screws $s'$. When the stitching operation is completed the rollers 51 ride down on the flat portions 54 of the cams 52 to allow the arms 45 to be lowered, through the action of gravity, whereby the saddle S will be carried downwardly away from the stitcher-mechanisms to the position indicated by dotted lines in Fig. 1 to dwell for an instant while the work is placed across its head 55.

In the forward, vertical face of the saddle S is a longitudinally-extending T-slot 58 which provides a means for fastening the clencher-devices L in position thereon. These latter comprise the usual clencher-plates 59, see Fig. 2, carrying the clenchers 60 pivoted adjacent the upper edge thereof, and adapted to be swung upwardly to engage the legs of the staple in the manner as well known in the art. The clencher-plates 59 are fastened in place on the vertical face of the saddle S by means of clamps 61, see Fig. 3, fitted to the slot 58 and adapted to be tightened against its sides by the screws 62 extending through the plates. Through this arrangement the clenchers may be adjusted longitudinally of the saddle S to bring them into coöperative relation with the staple-drivers D in the heads H, which latter, as before explained, are adjustable on the rail R to regulate the spacing of the staples along the work. The rockable clenchers 60 are operated from vertically-reciprocable bars 63 mounted to slide in bearings in the plates 59. The upper ends of the bars 63 are provided with fin-like projections 64 which are inserted between the rounded ends of two opposite arms 65 on each clencher 60, one bar engaging with each pair of associated clenchers as clearly shown in Fig. 2. As the bar 63 is slid upwardly it carries the clenchers 60 upwardly about their pivots, and as the bar moves downwardly they are withdrawn below the top of the plate 59 as illustrated in Fig. 2. The vertical bars 63 are reciprocated from a rail K which extends horizontally across the machine in parallel relation with the plate or rail 56 which carries the saddle S, see Figs. 1 and 2. The forward face of the rail K is formed with a longitudinal slot 66 which is engaged by fin-like projections 67 on the lower ends of the bars 63. This arrangement provides for the lateral adjustment of the bars in setting the clenchers in relation to their respective stitcher-heads while maintaining their connection with the rail K. The rail K is arranged to slide up and down in a slot 68 on the forward face of the plate 56 and is held in place by a series of vertical slats or bars 69 secured to lugs 70, projecting from the lower part of the plate, by means of the screws 71, see Figs. 3 and 4. At the opposite extremities of the rail K are headed studs 72 screwed into its under side and held in adjusted position by means of set-screws 73 entering the ends of the rail. The crowned heads of the studs 72 are adapted to be engaged by the upper ends of two vertical push-bars 74 which are slidably mounted in bearings 75, 76 bolted to the side-frames F. Journaled on the lower ends of the bars 74 are rollers 77, see Figs. 1, 3 and 4, which bear on the peripheries of two cams 78 keyed to the cam-shaft 4 to rotate therewith. Referring particularly to Fig. 4, coiled springs 79 anchored at one end to pins 80 on the lower bearings 76 are connected to pins 81 on the bars 74 to maintain the rollers 77 constantly bearing against the cams 78. The upper ends of the pusher-bars 74 are formed with block-like heads 82 which are beveled off on their forward sides at an angle of approximately forty-five degrees. This provides that as the saddle S swings downwardly from the position shown in full lines in Fig. 1, the studs 72 will ride off from the inclined face of the heads 82 without causing the rail K to alter its position. When the saddle S is in raised position beneath the stitcher-heads H the pusher-bars 74 are reciprocated up and down from the cams 78 to slide the rail K vertically in its slot on the front of the saddle-plate 56, and this motion is communicated through the vertical bars 63 to operate the clenchers 60 in the manner as before explained.

On the upper, inclined face of the saddle S is a longitudinally-extending slot 85 adapted to receive two slidable, alining bars 86, see Figs. 3 and 4. The bars 86 are held in place in the slot 85 by a flat plate 87 secured to the saddle S by countersunk screws 88 with its edge overlapping ledges 89 on the side of the bars and its upper face flush with the top thereof. The bars 86 carry work-guides or gages G at their outer ends which are adjustable longitudinally thereof in accordance with the width of the work to be operated upon. The gages G are attached to the bars 86 by thumbscrews 90 extending through slots 91 to adapt them to be set in coöperative relation to engage the opposite edges of the pages of the booklets placed across the saddle S. The gages G are arranged to be reciprocated from their sliding bars 86 to carry them toward each other so that the work will be brought into proper register with the stitching-mechanisms as the saddle comes beneath the stitcher-heads. The bars 86 are reciprocated in their slot 85 by means of link-motions arranged alongside the saddle-supporting arms 45 and operated from the rocking movement of the saddle as later explained. Referring particularly to Figs. 3 and 4, each bar 86 is provided with a block-like lug 92 on its under side which is engaged by a toe 93 on the end of one arm 94 of a bell-crank-lever 95. The bell-crank 95 is pivoted on a stud 96 projecting from the plate 56 of the saddle S. Pivotally connected to the other arm 97 of the bell-crank 95 is a rod or link 98 which extends vertically downward and is hinged at its lower end to one arm 99 of a second bell-crank 100. The bell-crank 100 is pivoted on a stud or pin 101 projecting from the side of the saddle-supporting arm 45 and to its other arm 102 is pivoted a link 103. The opposite end of the link 103 is pivotally joined to an arm 104 which extends upwardly from a hub 105 held fast on the cross-shaft 47 by means of the set-screw 106, see Fig. 4. It is to be understood that the connections last described are duplicated at the opposite end of the saddle S, each link-motion being arranged to operate one of the two alining gage-bars 86 to slide the correlated work-guides G toward each other as the saddle S is carried into position beneath the stitcher-heads H. Normally, the bars 86 are held apart or forced outwardly toward the ends of the saddle S by means of coiled springs 107, see Fig. 4, anchored to pins 108 on the saddle-head 55 and connected to pins 109 driven into the under side of the bars. The two link-motions are operated from the swinging movement of the saddle S as next explained: The arms 104 are held fast on the shaft 47 so that when the arms 45 swing upwardly the links 103 will rock the bell-cranks 100 in the direction indicated by the arrow x, Fig. 3. This rocking motion of the bell-cranks 100 is communicated through the vertical links 98 to rock the bell-cranks 95 whereby their arms 94 act against the lugs 92 on the bars 86 to slide the latter in the slot 85 against the tension of the springs 107. Through this action the left-hand gage or work-guide G, shown in Fig. 4, is slid to the right on the saddle S, while the opposite gage is moved to the left, it being understood that both gages are set to assume a position at a distance apart corresponding to the width of the work being stitched.

Referring now to Figs. 1 and 5, beneath the stitcher-heads H is a horizontal table T extending between the side-frames F. This I term the stacking-table since its purpose is to receive the booklets after they have been stitched to support them in vertical position resting on their edges. The stacking-table T comprises a series of parallel, spaced slats t screwed to laterally-extending cleats 110 which are bolted to the front and rear side of a rectangular plate 111, see Fig. 5. Bolted to the bottom of the plate 111 is a vertical pedestal or standard 112 which is of T-shape in cross-section, as illustrated by the dotted lines in Fig. 5. The opposite sides of the standard 112 are formed with parallel runners or gibs 113 adapted to slide up and down in ways 114 formed in two vertical cleats 115. The cleats 115 are bolted to a brace or cross-frame 116 extending horizontally between the side-frames F. Through this arrangement the pedestal or standard 112 is adapted to slide up and down to adjust the height of the table T in accordance with the width of the pages of the booklets to be stacked thereon. The adjustment of the table T is effected manually by means of a hand-wheel O located below it at the front of the machine as shown in Fig. 1. The wheel O is provided with a crank-handle o and is fast on the end of an inclined shaft 120 journaled in bearings 121, 122. The upper bearing 121 projects from a collar 123 secured to the cross-shaft 47 by means of the set-screw 124, see Fig. 9, while the lower bearing 122 is formed integral with the lower part of the cross-frame or brace 116. Referring to the detail view, Fig. 8, the lower end of the shaft 120 carries a skew-gear 125 keyed thereto at 126 and held in place against a shoulder 127 by means of a nut 128. The shaft 120 is also shouldered at 129 and a washer 130 takes its thrust in one direction against the bearing 122, while the opposite thrust is taken by the hub of the gear 125 on the other side of the bearing. Fastened to one of the gibs or runners 113 of the table-pedestal 112 is a gear-rack 131 formed with angular teeth meshing with the teeth of the gear 125. It will now be seen that by turning the shaft 120 by means of its hand-wheel O the gear 125 will be rotated to traverse the rack 131 to raise or lower the table T. To lock the table T in its adjusted position, means are provided to clamp the shaft 120 from turning in its bearings. For this purpose the upper shaft-bearing 121 is split longitudinally, as shown in Fig. 9, and a screw 133 extending across its split portion carries a finger-lever 134 through which it may be turned to bind the bearing against the shaft.

The groups of pages to be stitched are placed astride the saddle S, and after the latter has been carried up into position beneath the stitcher-heads H and the staples inserted through their folded portions and clenched together, the booklets are removed from the saddle and stacked on the table T through the operation of instrumentalities as next described: Referring particularly to Figs. 3, 6 and 7, two alining, horizontal, sliding bars 140 are arranged beneath the rail R at the rear of the stitcher-heads H, and each of these carries a gripper-finger 141 for reaching in between the folded pages of the booklets to draw them off from the saddle S. The bars 140 are formed with two parallel, lateral flanges or ribs 142, 143 on their front and rear sides and are fitted to slide in T-slots in rectangular blocks or guides 144. The guides 144 are held suspended on the under side of the rail R by means of vertical pins 145 formed with end-flanges or heads 146 fitted to T-shaped slots 147 in the guides. The slots 147 extend at an angle of approximately forty-five degrees across the blocks or guides 144, see Fig. 6, so that the latter may be slid on their holding-pins 145 to carry them rearwardly away from the front of the machine. The pins 145 are inserted through holes in a flange 148 on the under side of the rail R and are held in place by coiled springs 149 engaging washers secured to their upper ends by pins 150. Through this arrangement the guides 144 are held against the bottom of the rail R with a slight frictional pressure to resist any unwarranted movement until they are positively shifted as later explained. Each bar 140 is supported by two spaced-apart guides 144 to provide for its longitudinal, sliding movement therein, and the guides 144 are also slidable on their pins 145, as above explained, to carry the bars laterally toward and away from the stitcher-heads H. The guides 144 are moved from the sliding motion of the bars 140 through the means of pins 151, 152 projecting upwardly therefrom to adapt them to engage the ends of the guides when the bars are moved to a predetermined extent in either direction. Fastened to the under side of the bars 140 are angle-shaped arms 153 to which the fingers 141 are attached. The arms 153 are formed with horizontal portions which are provided with T-slots 154 fitted to receive the bottom-flanges 143 of the bars 140 to adapt them to be adjusted therealong. In the arms 153 are set-screws 155 adapted to bind against the bars to hold the arms in fixed position thereon. Through this provision the arms 153 may be set in position along their opposite bars 140 to bring their fingers 141 into proper relation with the side edges of the booklets under which they are to be inserted in the manner as later more fully explained. As shown in Figs. 6 and 7 the fingers 141 are formed from flat sheet-metal strips riveted to the vertical extensions 156 of the arms 153 and bent at right-angles to extend toward each other.

Referring now to Figs. 1 and 6, the sliding-bars 140 are operated from a pair of vertical shafts 157, 158 which are rockable in bearings 159, 160 fastened to the side-frames F, see also Fig. 11. Mounted on the upper ends of the shafts 157, 158 are two arms 161, 162 which are connected at their outer ends to the ends of the bars 140. For this purpose suitable pins 163 project upwardly from the arms 161, 162 to engage transverse slots 164 formed in plate-like extensions at the ends of the bars 140, see Fig. 7. Anchored to the side-frames F are coiled springs 165, shown in Fig. 6, which are connected at their opposite ends to pins 166 driven into the arms 161, 162. The tendency of the springs 165 is to swing the arms 161, 162 inwardly to slide the bars 140 toward each other, whereby the fingers 141 are caused to be inserted between the pages of the booklets as more fully explained hereinafter. It is to be noted that the right-hand arm 162, see Figs. 6 and 11, is fast on its shaft 158, being secured thereto by a set-screw 167 in its hub, while the left-hand arm 161 is free to turn on its shaft 157. The hub of the arm 161 surmounts the hub of a bell-crank lever 170 arranged beneath it abutting the top of the bearing 159. The arm 161 is held against the bell-crank 170 on the reduced end of the shaft 157 by a washer 171 secured to the shaft by a screw 172. The bell-crank 170 is held fast on the shaft 157 by a set-screw 173 in its hub, and has an arm 174 reaching out beneath the arm 161. At the end of the bell-crank arm 174 is a pin 175 adapted to engage the side of a corresponding pin 176 driven into the under side of the arm 161. This provides that when the bell-crank 170 is rocked in the direction indicated by the arrow $z$, Fig. 6, it will swing the arm 161 away from the side-frame F against the tension of the spring 165. The bell-crank 170 is rocked from the oscillation of the shaft 157 and the motion is communicated to the other shaft 158, but in the opposite direction, through means as next described: The bell-crank 170 has another arm 177 reaching through an opening in the side-frame F and at its end is a vertical rod 178 extending downwardly through one arm 179 of a second bell-crank 180, see Fig. 11. The second bell-crank 180 is fast on the lower end of the shaft 157, being held in place by a set-screw 181. Referring now to Fig. 5, one arm 182 of the bell-crank 180 extends rearwardly, and pivotally connected to its end by a screw 183 is a horizontal link 184. The link 184 reaches across the whole width of the machine and is connected to a forwardly extending lever or arm 185 fast on the lower end of the right-hand vertical shaft 158. For this purpose the end of the link 184 is slotted to receive a screw 186 carried at the end of the arm 185. It will be noted from Fig. 5 that the link 184 crosses the plane of the vertical axes of the shafts 157, 158, or in other words it reaches from the rear of the shaft 157 to the front of the shaft 158. Being thus connected with the arms 182 and 185 on opposite sides of the respective axes of the shafts 157, 158, it is obvious that the turning movement of the shaft 157 in one direction will be communicated to the shaft 158 to rock the latter in the opposite direction. In other words, as the shaft 157 is turned to carry its upper arm 161 to the left, the shaft 158 will be rocked to swing the arm 162 to the right, both arms moving against the tension of their springs 165 to slide the bars 140 outwardly to draw their fingers 141 apart. Referring now particularly to Figs. 1, 5 and 11, the shaft 157 is rocked from its bell-cranks 170 and 180 by means of a lever 187. As shown in Fig. 1, the lever 187 is of substantially sickle shape having a forwardly extending arm 188 carrying a roller 189 journaled on a pin 190 at its end. The roller 189 is adapted to ride on the periphery of a cam 191 fast on the cam-shaft 4. The cam 191 is substantially pear-shaped in outline having a nose or hump 192 which causes the lever 187 to be rocked downwardly as its roller 189 rides over it. The other curved arm 193 of the lever 187 reaches upwardly adjacent the lower end of the vertical rod 178 which connects the bell-cranks 170 and 180. At its ends is a hub 194 bored to receive a pin or stud 195 which projects from the side of a slide 196. The slide 196 is slotted to receive the rod 178, and through these connections, when the lever 187 is rocked its arm 193 will swing the bell-cranks 170—180 about their axis to oscillate the shafts 157, 158 to operate their arms 161, 162 in the manner as before described.

Referring now to Figs. 3 and 5, a series of vertical fingers N spaced across the front of the stacking-table T coöperate with the upper gripper-fingers 141 to draw the booklets off from the saddle S and carry them back against the stack. These fingers N are termed the retaining-fingers since their function is, more particularly, to hold the booklets in place in the stack. They comprise relatively thin, flat spring-blades secured to a horizontal cross-bar 200 which is arranged for vertical and lateral movement beneath the front of the table T. As shown in Fig. 5 the fingers N project upwardly from their supporting-bar 200 through slots 201 at the forward ends of the table-slats $t$, and are arranged in parallel, staggered relation with the vertical slats 69 carried on the front of the saddle S. The finger-bar 200 is supported at the outer ends of two levers 202, 203 which are keyed to the ends of a rock-shaft 204. The shaft 204 is mounted free to turn in opposite bearings 205 bolted to the rearward side of the front cross-cleat 110 of the table T. The bar 200 is rockably mounted on the ends of the levers 202, 203 by means of trunnions 206 at its ends engaging suitable holes in the levers. Through this arrangement the rocking motion of the levers will cause the bar to be vertically reciprocated, and the bar 200 may also be rocked on the axis of its trunnions 206 for a purpose as later explained. The shaft 204 is rocked to oscillate the levers 202, 203 through the connection of the left-hand lever 202 with a horizontal, sliding rod 207. For this purpose the lever 202 is formed as a bell-crank having an upwardly-extending arm 208 carrying a roller 209 which engages a slot 210 in the side of the rod 207, see detail view, Fig. 12. It will be noted from this view and also from Fig. 3 that the slot 210 is slightly wider than required to accommodate the roller 209 so that normally there would be lost motion between the parts. To prevent this, however, except under abnormal conditions, a cushioning-device is provided between the roller and the rod comprising a slidable plunger 211 at one side of the slot. The plunger 211 slides in a bore 212 in the rod 207 under pressure of a spring 213 held in place by a screw-plug 214. The purpose of this yielding connection is to prevent the fingers N from being bent or broken should they meet with any obstruction during their operation from the rod 207.

The rod 207 slides in bores 215 in the cross-cleats 110 of the table T, and is moved rearwardly by a compression-spring 216 held on its end between a collar 217 and the side of the rearward cleat 110, see Fig. 5. At its forward end the rod 207 carries a pin 218 slidable in a slot 219 in a vertical plate 220. The plate 220 is splined to the side of an angle-shaped bracket 221 by means of a tongue 222 fitted to a slot 223, see Fig. 12, the bracket 221 being bolted to the side of the cross-cleat 110, as shown in Fig. 5. On the plate 220 is a stud 224 projecting through a slot 225 in the bracket 221 whereby to provide for a limited, horizontal, sliding movement of the plate as later more fully explained. On the end of the stud 224 is a washer 226 held in place by a pin 227. A spring 228 bears against the washer 226 and a second washer 226$^a$ abutting the side of the bracket 221 and thereby holds the plate 220 snugly in place thereon. Referring again to Fig. 3, the front of the plate 220 is formed with an arcuate groove or slot 229 which is engaged by a roller 230 journaled on a pin 231 projecting from the end of the finger-bar 200. As the levers 202, 203 are rocked downwardly, by the rocking motion of their connecting-shaft 204, the roller 230 rides downwardly in the slot 229, the relation of the slot 229 to the path of movement of the trunnions 206 being such as to normally maintain the finger-bar 200 vertical during its reciprocating movement. It has before been explained that the rocking motion of the shaft 204 is effected by the sliding movement of the rod 207, and as the latter approaches the limit of its forward thrust the pin 218 at its end comes into engagement with the end of the slot 219 in the plate 220. At this juncture the plate 220 will be slid to the left on its bracket 221, as viewed in Fig. 3, and through the engagement of its slot 229 with the roller 230 the finger-bar 200 will be rocked forwardly on its trunnions 206. This action takes place as the bar 200 reaches the end of its downward movement and causes the fingers N to be inclined outwardly toward the saddle S whereby when they are raised again with the bar 200 they will be inserted under the lower edges of the pages of the booklet depending from the top of the saddle. It will thus be seen that the fingers N are lowered or dipped and then tilted forward before being raised again and both of these motions are effected by the sliding movement of the rod 207. The rod 207 is slid forwardly against the action of its spring 216 by means of an arm 232, see Fig. 5, which bears against the side of the vertical rod 178 carried by the bell-cranks 170, 180, it having been previously explained that the bell-cranks are oscillated from the rocking motion of the lever 187.

Referring to Figs. 13 and 14, the booklets X are stacked on edge on the table T against a sliding rest or support V. This latter may be of any usual arrangement, and as shown in Fig. 3 comprises an angle-shaped bracket having a foot 235 resting on the table-slats t. Fitted to slide between the slats t are one or more guides 236 which hold the bracket square with the front of the table while allowing it to be pushed back therefrom by the stacking of the successively-bound booklets against its forward face.

Having now described the construction and arrangement of the several coördinated mechanisms of the machine, its method of operation will next be explained: Assuming that the saddle S has been carried back to the position illustrated by dotted lines in Fig. 1, the work to be stitched is laid across its top with the folded leaves or pages of the booklet X straddling the triangular head 55. While I have herein referred to the work as consisting of a single booklet or pamphlet, simply for convenience of explanation, it is to be understood that each piece to be operated upon generally comprises several booklets. That is to say, it is made up of groups of the folded pages of a full form, extending in undivided series to comprehend a plurality of complete booklets, the strips in some cases being several feet long. Usually, the pages are folded within a cover of heavier stock and when stitched together with eight, twelve or more staples, as may be required, the strip is cut apart into the individual booklets. As before explained, the operation of the machine is entirely automatic, the saddle S being carried back and held stationary to receive the work and then moved up into coöperative relation with the stitcher-heads in substantially the same manner that the platen of a printing-press operates. The saddle S is rocked back and forth on its arms 45 which are pivoted on the cross-shaft 47, movement being imparted thereto through the rotation of the cams 52 which operate on the rollers 51. As the saddle S rises into position beneath the stitcher-heads H the link-motions on its arms 45 come into action to slide the side-gages or guides G along its inclined, forward face to locate the work in proper relation with the stapling-devices. Referring particularly to Fig. 3, the links 103 are held fast at their inner ends by the arms 104 secured on the cross-shaft 47. The outer ends of the links 103 being joined to the arms 102 of the bell-cranks 100 will therefore cause the latter to be rocked in the direction indicated by the arrow x, Fig. 3, to slide the links 98 longitudinally upward. The links 98 being connected to the arms 97 of the upper bell-cranks 95, as shown in Fig. 4, the latter will be rocked to cause their arms 94, bearing against the lugs 92, to slide the guide-bars 86 inwardly toward the center of the machine. As before explained, the side-gages G are adjusted in position on their sliding bars 86 by means of the thumb-screws 90 so that their inner ends will engage with the outer edges of the work when they are shifted to the end of their strokes. Therefore, if the work X is not placed accurately on the saddle S, one or the other of the gages G will engage the end of the piece to shift it into position with its opposite end against the complementary gage whereby to bring it into register with the stapling-devices to provide for the proper location of the staples.

As the saddle S comes into position beneath the stitcher-heads H its forward face brings up against the stop-screws, see Fig. 3, in perpendicular relation with the stacking-table T. At this point the rollers 51 on the saddle-arms 45 will have traveled onto the concentric portions 53 of the cams 52 so that thereafter, for a relatively brief period, the saddle will remain at rest in its uppermost position. During this interval of rest in the operation of the saddle the stitching-mechanisms in the heads H come into play to insert the staples through the work in the manner as next explained: As before mentioned, the reciprocating elements of the stitching-mechanisms in the several heads H are all connected with the vertically-slidable crosshead C which receives its motion from the rocker-arms 15, see Fig. 1. These latter are connected with the lower rocker-levers 10 by means of the vertical links 13 and the levers 10 are rocked from the eccentrics 6 on the cross-shaft 4. The rotative action of the eccentrics 6 is timed to rock the levers 10 and 15 to start the downward movement of the crosshead C before the saddle S reaches its uppermost position so that the staples will be already formed and ready for insertion through the work immediately the latter comes into place beneath the stitcher-heads H. For this purpose the staple-formers E, see Fig. 2, are caused to descend to act on the lengths of wire fed to the forming-anvils A to bend down the parallel legs of the staples in the manner as well known in the art. The formed staples are held within the sides of the formers E and at the end of the latters' downward stroke they are carried into position with their points against the work X supported by the saddle S. Meanwhile, the staple-drivers D are also being carried downwardly in the heads H and as the formers E are brought to rest against the work the drivers continue their descent to force the staples through the pages. This differential motion between the staple-formers and staple-drivers is effected through the operation of means as fully described in my U. S. Letters Patent herein previously referred to, and it will suffice for the present purpose to state that these elements and, in fact, all of the moving parts of the stitching-mechanisms, are actuated from a single prime mover, i. e. the reciprocating crosshead C. As the drivers D drive the staples through the folds of the pages which lie open across the saddle S. as indicated by the dash lines in Fig. 1, the clencher-devices L come into action as next explained:

As before stated the clencher-mechanisms L are mounted on the forward face of the saddle-head 55, being adjustable in position therealong to correlate them with their respective stitcher-heads, and are operated from the horizontal reciprocating rail K. The rail K is reciprocated from the vertical motion of the pusher-bars 74 inparted thereto through the engagement of their rollers 77 with the cams 78. Referring to Figs. 1 and 2, the action of the cams 78 is so timed as to synchronize the operation of the clenchers 60 with that of the staple-drivers D. As the drivers D force the legs of the staples down through the work their points meet the inclined, upper arms 65 of the clenchers 60, tending to force the legs inwardly toward each other. As the legs of the staples continue to protrude through the folded pages of the work the rail K starts to rise under the action of its pusher-rods 74 which are forced upwardly by their cams 78. The rail K is therefore caused to slide the bars 63 upwardly, and these latter acting on the clenchers 60 swing them on their pivots to raise their arms above the top of the saddle S. This action causes the legs of the staples to be bent or bowed upwardly to clench them firmly in place whereby to prevent them from springing back when the pressure is removed.

During this coöperative action of the stapling-mechanisms and their associated clencher-devices the upper and lower stacking-fingers are brought into play to perform their functions as next explained: Immediately the saddle S comes to rest in its upper position the gripper-fingers 141 start to move inwardly toward each other. This action is caused by the sliding motion of the opposite bars 140, see Figs. 3, 6 and 7, under the influence of the arms 161, 162, shown in Fig. 6. The arms 161, 162 are rocked inwardly by their springs 165, this motion being controlled through the vertical shafts 157, 158 shown in Figs. 1, 6 and 11. The left-hand shaft 157, see Fig. 11, is rocked through its bell-cranks 170, 180, connected by the vertical rod 178, which latter is acted upon by the slide 196 carried at the end of the arm 193 of the lever 187. It has already been explained that the lever 187 is oscillated from the cam 191 acting on its roll 189, and the motion imparted to the shaft 157 through the above described train of elements is communicated to the other shaft 158 to rock it in the opposite direction through the means of the cross-link 184 shown in Figs. 5 and 11.

Referring now to Fig. 13, the booklet-strip X sits astride the saddle S with half of its pages hanging down in vertical position in front of the upright slats 69. This leaves an open space between the front face of the saddle S and the pages so that the gripper-fingers 141 may be inserted thereunder to draw the work off from the saddle as the latter moves away from its upper position. As before stated, the fingers 141 are slid into place between the open pages of the booklet-strip by the longitudinal movement of their bars 140. During the first part of this movement the bars 140 are in their forward position, and slide freely through their guides 144, see Figs. 6 and 7. As the bars 140 approach the inner extremes of their traverse, however, the pins 151 come into engagement with the ends of the guides 144 so that thereafter the guides will be moved by and with the bars. In other words, as the longitudinal movement of the bars 140 is continued the guides 144 will be slid therewith along the under side of the rail R. This displacement of the guides 144 is provided for by the slots 147 with which their supporting-studs 145 engage, and it has already been explained that the slots 147 are set at an angle so that the guides 144 will be carried rearwardly with respect to the front of the machine. It is obvious that as the guides 144 are thus displaced rearwardly they will carry the bars 140 back with them so that a slight, lateral movement is imparted to the latter in addition to their longitudinal traverse. In this manner motion is communicated to the fingers 141 to cause them to be inserted between the pages of the booklet-strip X in their forward position, as shown in Fig. 13, and to then be drawn back as illustrated in Fig. 14. Referring to these two views, the stacking-table T is set at the proper height to adapt the lower edges of the pages depending from the saddle S to rest on its top, this vertical adjustment of the table being effected by turning the hand-wheel O, see Fig. 1, to raise or lower the table-pedestal 112 in the manner as previously explained. Before the machine starts to operate the work-rest or bracket V is also adjusted close up to the front of the table T so that the booklet-pages will be brought into place against its forward, vertical face and held in this position by the slats 69 on the front of the saddle S. The fingers 141 are inserted between the pages of the booklet-strip during the stitching operation on its folded portion, and as soon as the stapling is completed the fingers are drawn back away from the saddle to flatten the pages against the work-rest V.

Meanwhile, during this functioning of the upper gripper-fingers 141, the lower retaining-fingers N are also being operated to insert them in under the lower edges of the booklet-pages in the manner as next explained: While the saddle S is rising into position beneath the stitcher-heads H the slide-rod 207 below the table T, see Figs. 3, 5 and 12, is being moved forward under the impulse of the rod 178 acting against its cross-arm 232, the rod 178 receiving its movement with the bell-cranks 170, 180, through the operation of the lever 187, Figs. 1 and 11, as previously explained. As the rod 207 slides forward the engagement of its slot 210, see Figs. 3 and 12, with the stud or roller 209 on the arm 208 of the bell-crank 202 causes the latter to be rocked downwardly as illustrated in Fig. 13. The outer end of the bell-crank 202 is connected by the trunnions 206 with the horizontal bar 200 which carries the fingers N, and the latter will thus be lowered beneath the top of the table T. As the rod 207 approaches the end of its outward traverse, the pin 218 at its forward end comes into engagement with the end of the slot 219 in the plate 220 and the latter is slid forward on its bracket 221, see Fig. 12. Engaging the slot 229 in the side of the plate 220 is the roller 230 at the end of the finger-bar 200, and through this connection the bar 200 is tilted forward to incline the fingers N outwardly beyond the edges of the pages of the booklet-strip X. Now, as the bar 207 is slid back in the opposite direction, under the action of its spring 216, see Fig. 5, the bell-cranks 170 and 180 and their connecting-rod 178 having had their motion reversed by the action of the lever 187, shown in Fig. 1, the bell-crank 202 is rocked back again to the position shown in Fig. 3. As the rod 207 approaches the end of its rearward movement its pin 218 engages the opposite end of the slot 219 in the plate 220, and the latter is thereby drawn back to first position. This action causes the finger-bar 200 to be swung back into vertical position, bringing the fingers N perpendicular to the top of the table T. In this way the lower fingers N are inserted under the lower edges of the pages depending from the saddle S and then drawn laterally back into the slots 201 in the table-slats t to hold the booklet-strips against the work-rest V. At the same time the upper fingers 141 are also drawn back against the pages at the top, see Fig. 14, and meanwhile the saddle S has started to swing back away from the table T. As the saddle S swings outwardly, the stapled booklet-strip X will be held by the fingers 141 and N, and the pages lying across the top of the saddle will slide off therefrom and fall into place at the front of the fingers. In this way, as the booklet-strips are successively stapled to bind their leaves together, the fingers 141 and N coöperate to draw them off from the saddle and stack them in series on the top of the table T, as shown in Fig. 14, the work-rest V being gradually pushed back as one after another of the booklet-strips is added to the front of the stack.

As the saddle S moves outwardly from the front of the machine to receive each new set of pages to be stapled, the gages G on its top recede from each other and it is only required to place the work across the saddle between them; then when the saddle starts back again the gages G are carried toward each other to bring the work into register with the stitching-mechanisms, this operation being effected automatically from the link-motions on the saddle-arms 45 which are actuated from the movement of the saddle as before explained. The operation of the gripper-fingers 141 and retaining-fingers N is also entirely automatic and synchronized with the movement of the saddle S. As the saddle S moves away from the table T the fingers 141 remain in their rearward position pressing against the last booklet-strip laid against the stack. When, however, the saddle S starts back again, the fingers 141 are first withdrawn from the edges of the pages as their bars 140 are slid outwardly through the guides 144, see Figs. 6 and 7. As the saddle comes into place beneath the stitcher-heads H the fingers are carried forward again, this action being effected by the engagement of the pins 152 with the ends of the guides 144. In other words, the action of the fingers 141 as first explained is reversed, the sliding movement of the bars 140 away from each other causing the guides 144 to be displaced outwardly on their supporting-pins 145 before the bars start back toward each other again. In this way the fingers 141 are given a rectangular motion: first away from each other; then forward; then toward each other; and backward. This action arises from the opposite, rocking motion of the two arms 161, 162 shown in Fig. 6, the springs 165 serving to move the arms toward each other, while the opposite movement of the left-hand arm 161 is effected by the engagement of its pin 176 with the pin 175 on the upper bell-crank 170, and in the case of the arm 162 through the rocking of its shaft 158 under the action of the link 184 connecting the lower bell-crank 180 with the lever 185, see Figs. 5 and 11.

It is to be understood that the machine is adjusted for operation in accordance with the character of the work to be stitched by mounting a suitable number of stitcher-heads H on the supporting-rail R and setting them at intervals therealong to give the desired spacing between the several staples to be inserted through the pages. It has also been explained that the range of action of the stapling-mechanism in all of the heads H may be adjusted simultaneously.

For instance, where the booklets to be stapled have a large number of pages and are relatively bulky longer staples will be required than for thin pamphlets, comprising fewer pages. The whole adjustment of the machine may be accomplished very easily and expeditiously through the single manually-operated mechanism illustrated in Figs. 1 and 10. All that is required is to loosen the set-screw 35 at the end of the crank-arm 30, after which the arm is turned to raise or lower the supporting-shaft 20. The vertical adjustment of the shaft 20 raises or lowers the pivots for the rocker-arms 15 and thereby changes the relation between the reciprocating crosshead C and the work to be stitched. In this way the parts connected to the crosshead C may be raised away from the work or lowered toward it in accordance with the thickness of the stock being operated upon. At the same time the arms 27 are raised or lowered at their forward ends and these elements being connected with the wire-feed and wire-cutters regulate the action of these devices in accordance with the length of staples required.

When once adjusted the machine operates automatically and continuously, without particular attention on the part of the operator, the only manual operation required being the placing of the work on the saddle as the latter swings back to receive it.

Various modifications might be made in the form and construction of the parts of my improved device without departing from the spirit or scope of the invention; therefore, without limiting myself to the exact embodiment shown and described, what I claim is:—

1. In a wire-stitching machine for stapling booklets, pamphlets or the like, the combination with a plurality of stitcher-heads carrying the stapling-mechanisms, of a work-saddle movable into coöperative relation with the stitcher-heads, means to carry the saddle back and forth with respect to the heads, side-gages on the saddle for positioning the work in proper relation with the stitching-mechanisms, and means to slide the gages toward each other on the saddle to engage them with the edges of the work to shift the latter into position therealong.

2. In a wire-stitching machine for stapling booklets, pamphlets or the like, the combination with a plurality of stitcher-heads carrying the stitching-mechanisms, of a work-saddle movable into coöperative relation with the stitcher-heads, means to carry the saddle back and forth beneath the stitcher-heads, side-gages movable toward each other on the saddle to shift the work therealong, and means operated from the movement of the saddle to actuate the gages to position the work in relation with the stitching-mechanisms.

3. In a wire-stitching machine for stapling booklets, pamphlets or the like, the combination with a plurality of stitcher-heads carrying the stapling-mechanisms, of a work-saddle mounted to swing into coöperative relation with the stitcher-heads, means to oscillate the saddle back and forth beneath the stitcher-heads, side-gages slidable toward each other along the saddle to engage the work to shift it into position in relation to the stitcher-heads, and link-motions operated from the movement of the saddle to slide the gages.

4. In a wire-stitching machine for stapling booklets, pamphlets or the like, the combination with a plurality of stitcher-heads carrying the stapling-mechanisms, of a work-saddle mounted to swing into coöperative relation with the stitcher-heads, means to swing the saddle back and forth with respect to the heads, side-gages slidable in opposite directions on the saddle to engage the edges of the work, means to adjust the gages in coöperative relation at varying distances apart, and means to slide the gages toward and away from each other as the saddle moves toward the heads and recedes therefrom.

5. In a wire-stitching or stapling machine, the combination with the stitching-mechanisms, of a work-saddle movable into coöperative relation therewith, means to carry the saddle back and forth with respect to the stitching-mechanisms, gage-bars slidable toward each other longitudinally of the saddle, side-gages adjustable along the bars to adapt them to be set to bring them into engagement with the edges of the work, and means to slide the bars to shift the gages against the work during the movement of the saddle into position adjacent the stitching-mechanisms.

6. In a wire-stitching or stapling machine, the combination with the stitching-mechanisms, of a swinging work-saddle movable into coöperative relation therewith, means to move the saddle back and forth with respect to the stitching-mechanisms, two bars slidably mounted on the saddle, side-gages adjustable longitudinally of the bars, bell-cranks connected to slide the bars, and links connected with the bell-cranks to rock the latter from the swinging movement of the saddle.

7. In a wire-stitching or stapling machine, the combination with the stitching-mechanisms, of a work-saddle pivotally mounted to adapt it to swing into coöperative relation with the stitching-mechanisms, means to swing the saddle back and forth with respect to the stitching-mechanisms, side-gages slidably mounted on the saddle to adapt them to be carried into engagement with the work, bell-cranks connected to slide the gages, a second set of bell-cranks connected to the first set, and links connected to the second set of bell-cranks and anchored at their ends at points eccentric to the pivots of the saddle whereby the swinging movement of the latter will rock the bell-cranks to slide the gages toward and away from each other.

8. In a wire-stitching or stapling machine, the combination with a plurality of stapling-mechanisms, of means to operate said mechanisms in unison, a work-saddle for supporting the work beneath the stapling-mechanisms, means to effect a relative displacement between the saddle and stapling-mechanisms to facilitate the application of the work to the saddle, mechanism operated from the movement of the saddle for shifting the work on the saddle to position it with respect to the stapling-mechanisms, and clencher-devices carried by the saddle to coact with the stapling-mechanisms to complete the stapling operation.

9. In a wire-stitching or stapling machine, the combination with a plurality of stapling-mechanisms, of a work-saddle for supporting the work in correlation with the stapling-mechanisms, means to shift the work-saddle back and forth with respect to the stapling-mechanisms, and means for engaging the opposite sides of the work to remove it from the saddle as the latter recedes from the stapling-mechanisms after the completion of the stapling operation.

10. In a wire-stitching or stapling machine, the combination with a plurality of stapling-mechanisms, of a work-saddle adapted to be carried into coöperative relation with the stapling-mechanisms, means to carry the saddle back and forth with respect to the stapling-mechanisms, means to shift the work on the saddle to position it in relation to the stapling-mechanisms, and means to engage the opposite sides of the work to remove it from the saddle after the completion of the stapling operation.

11. In a wire-stitching or stapling machine, the combination with a plurality of stapling-mechanisms, of a work-saddle for supporting the work in correlation with the stapling-mechanisms, means to shift the saddle back and forth with respect to the stapling-mechanisms, means to engage the opposite sides of the work to draw it off from the saddle as the latter recedes from the stapling-mechanisms, and means to also operate said work-engaging means to stack the pieces of work together as they are removed from the saddle.

12. In a wire-stitching machine for stapling booklets or the like, the combination with the stapling-mechanisms, of a work-saddle for supporting the booklets with their pages in open relation beneath the stapling-mechanisms, means to carry the saddle back and forth with respect to the stapling-mechanisms, fingers adapted to be moved toward each other to insert them between the pages of the booklets as the work-saddle comes into position beneath the stapling-mechanisms, and means to operate said fingers to remove one piece of work from the saddle and to then engage the next piece as the booklets are successively operated upon by the stapling-mechanisms.

13. In a wire-stitching machine for stapling booklets or the like, the combination with the stapling-mechanisms, of a work-saddle for supporting the booklets with their pages in open relation beneath the stapling-mechanisms, fingers adapted to be inserted between the pages of the booklets as they rest on the saddle, and means to actuate said fingers with a rectangular movement to cause them to enter between the pages of the booklets to draw the latter off from the saddle and to then separate and move forward into position to engage the next booklet brought into place on the saddle.

14. In a wire-stitching machine for stapling booklets or the like, the combination with the stapling-mechanisms, of a work-saddle for supporting the booklets with their pages in open relation beneath the stapling-mechanisms, stacking-means operating to move forwardly and inwardly to insert them between the pages at the sides of the booklets to draw them off from the saddle, and auxiliary means for holding a plurality of the booklets in stacked relation as the first-named stacking-means operates on each successive piece of work being stapled.

15. In a wire-stitching machine for stapling booklets or the like, the combination with the stapling-mechanisms, of a work-saddle for supporting the booklets with their pages in open relation beneath the stapling-mechanisms, gripper-fingers operating to move forwardly and then inwardly to insert them between the pages at the sides of the booklets held on the saddle, means to operate said fingers to draw each piece of work off from the saddle after the stapling operation is completed, and retaining-fingers for holding the stapled booklets in stacked relation as they are removed from the saddle.

16. In a wire-stitching machine for stapling booklets or the like, the combination with the stapling-mechanisms, of a work-saddle for supporting the booklets with their pages in open relation beneath the stapling-mechanisms, a pair of fingers operating to move forwardly and then inwardly to insert them between the pages of the booklet at the sides of the work, means to actuate said fingers to draw each successively stapled piece of work off from the saddle, an auxiliary set of fingers for holding the booklets in stacked relation, and means to operate the auxiliary fingers to press the booklets against the stack after they have been removed from the saddle.

17. In a wire-stitching machine for stapling booklets or the like, the combination with the stapling-mechanisms, of a work-saddle for supporting the booklets with their pages in open relation beneath the stitching-mechanisms, means to operate the saddle to carry it toward and away from the stapling-mechanisms, fingers operating to move forwardly and then inwardly to insert them between the pages at the sides of the booklets held on the saddle, means to operate said fingers to draw the stapled booklets off from the saddle as the latter recedes from the stapling-mechanisms, and means to hold the booklets in stacked relation as the saddle moves back and forth in relation to the stapling-mechanisms.

18. In a wire-stitching machine for stapling booklets or the like, the combination with the stapling-mechanisms, of a work-saddle for supporting the booklets beneath the stapling-mechanisms, a stacking-table for receiving the stapled booklets with the lower edges of their pages resting thereon, means to move the saddle toward and away from the stacking-table, and means to draw the booklets off from the saddle and stack them on the table as the saddle recedes therefrom.

19. In a wire-stitching machine for stapling booklets or the like, the combination with the stapling-mechanisms, of a work-saddle for supporting the booklets beneath the stapling-mechanisms, a stacking-table for receiving the stapled booklets with the lower edges of their pages resting thereon, means to move the saddle toward and away from the stacking-table, means to draw the booklets off from the saddle onto the table as the saddle recedes therefrom, and means to hold the booklets in stacked relation on the table during the movement of the saddle toward and away therefrom.

20. In a wire-stitching machine for stapling booklets or the like, the combination with the stapling-mechanisms, of a work-saddle for supporting the booklets beneath the stapling-mechanisms, means adapted to be inserted between the leaves of the booklets at the sides of the work to draw the latter off from the saddle, and auxiliary means adapted to be inserted under the lower edges of the pages of the booklets to hold the latter in stacked relation.

21. In a wire-stitching machine for stapling booklets or the like, the combination with the stapling-mechanisms, of a work-saddle for supporting the booklets beneath the stapling-mechanisms, a pair of fingers adapted to be inserted between the pages of the booklets to draw them off from the saddle after the completion of the stapling operation, slidable bars for operating the fingers, and means to operate the bars with a lateral and longitudinal movement in the manner and for the purpose substantially as described.

22. In a wire-stitching machine for stapling booklets or the like, the combination with the stapling-mechanisms, of a work-saddle for supporting the booklets beneath the stapling-mechanisms, two opposite slidable bars, fingers adjustable on the bars to adapt them to be brought into position to enter between the pages of the booklets held on the saddle, and means to actuate the bars with a rectangular movement to cause their fingers to move forward and inward to engage the booklets and to then recede from the saddle to draw the booklets off therefrom.

23. In a wire-stitching machine for stapling booklets or the like, the combination with the stapling-mechanisms, of a work-saddle for supporting the booklets beneath the stapling-mechanisms, a pair of opposite slidable bars, means to slide the bars toward and away from each other, guides through which the bars slide, means to displace the guides laterally as the bars are slid longitudinally therethrough, and means on the bars for engaging the pages of the booklets during the rectangular movement of the bars.

24. In a wire-stitching machine for stapling booklets or the like, the combination with the stapling-mechanisms, of a work-saddle for supporting the booklets in position in relation thereto, a pair of slidable bars, guides through which the bars slide, studs engaging inclined slots in the guides, means on the bars adapted to engage the ends of the guides, means to move the bars to cause them to be slid through the guides and to shift the latter laterally on their studs, and fingers on the bars adapted to be operated therefrom with a rectangular movement to cause them to engage the pages of the booklets on the work-saddle in the manner and for the purpose substantially as described.

25. In a wire-stitching machine for stapling booklets or the like, the combination with the stapling-mechanisms, of a work-saddle for supporting the booklets beneath the stapling-mechanisms, means for drawing the booklets off from the saddle after each stapling operation, a stacking-table for receiving the stapled booklets with the lower edges of their pages resting thereon, retaining-fingers for holding the booklets in stacked relation on the table, and means to operate the retaining-fingers to cause them to be lowered beneath the stacking-table and then raised and drawn back to press the successively-stapled booklets against the front of the stack.

26. In a wire-stitching machine for stapling booklets or the like, the combination with the stapling-mechanisms, of a work-saddle for supporting the booklets beneath the stapling-mechanisms, means for drawing the booklets off from the saddle after each stapling operation, a stacking-table for receiving the stapled booklets with the lower edges of their pages resting thereon, a series of retaining-fingers extending across the front of the table, and means operating to lower the fingers beneath the table and to then tilt them forward and raise them into position between the open pages of the booklet held on the saddle.

27. In a wire-stitching machine for stapling booklets or the like, the combination with the stapling-mechanisms, of a work-saddle for supporting the booklets beneath the stapling-mechanisms, means for removing the booklets from the saddle after each stapling operation, a stacking-table for receiving the stapled booklets, a vertically-reciprocable and rockable bar beneath the table, a series of fingers carried by said bar projecting upwardly along the front of the table, means to lower the bar and rock it forwardly to tilt the fingers out from the table, and means to raise the bar and tilt it rearwardly to draw the fingers back against the booklets supported on the stacking-table.

28. In a wire-stitching machine for stapling booklets or the like, the combination with the stapling-mechanisms, of a work-saddle for supporting the booklets beneath the stapling-mechanisms, means for removing the booklets from the saddle after each stapling operation, a stacking-table for receiving the booklets in stacked relation, and means to adjust the table vertically in relation to the work-saddle in accordance with different sizes of booklets operated upon.

29. In a wire-stitching or stapling machine, the combination with the staple-forming and staple-driving devices, of a reciprocable member for actuating said devices, rocker-arms connected to reciprocate said member, a shaft mounted to turn in eccentric bearings, means for pivotally supporting the rocker-arms on said shaft, and means for turning the shaft in its bearings to raise or lower the rocker-arm pivots to regulate the range of action of the parts operated therefrom.

30. In a wire-stitching or stapling machine, the combination with the staple-forming and staple-driving devices, of reciprocable means for actuating said devices, a pivoted rocker-arm for reciprocating said means, an eccentric bearing for the pivot of the rocker-arm, and means to turn said bearing to raise or lower the axis of the rocker-arm whereby to adjust the range of action of the staple-forming and staple-driving devices in accordance with the requirements of the work being stapled.

31. In a wire-stitching or stapling machine, the combination with the reciprocable stapling-devices, of a crosshead connected to actuate said devices, a pair of rocker-arms for reciprocating the crosshead, a cross-shaft mounted to turn in eccentric bearings, supporting-arms carried by said cross-shaft, means for pivoting the rocker-arms on the supporting-arms, and means for turning the shaft in its bearings to raise or lower the supporting-arms whereby to adjust the vertical position of the pivots of the rocker-arms to regulate the range of action of the stapling-devices operated thereby.

32. In a wire-stitching or stapling machine, the combination with vertically-reciprocable staple-forming and staple-driving devices and vertically-adjustable wire-feeding means, of a rocker-arm for reciprocating the staple-forming and staple-driving devices, a shaft mounted in an eccentric bearing, means for pivotally supporting the rocker-arm from said shaft, an arm mounted on the eccentric shaft and connected with the wire-feeding means, and means to turn the shaft in its bearing whereby to raise or lower the pivot for the rocker-arm to regulate the range of action of the staple-forming and staple-driving devices while also adjusting the wire-feeding means to regulate the length of the staples applied to the work.

33. In a wire-stitching or stapling machine, the combination with the vertically-reciprocable staple-forming and staple-driving devices, of a crosshead for reciprocating said devices, a horizontal shaft mounted in eccentric bearings, rocker-arms pivotally supported from said cross-shaft, means for turning the shaft to raise or lower the pivots of the rocker-arms, and means to lock said shaft in its adjusted position.

34. In a wire-stitching or stapling machine, the combination with the reciprocable stapling-devices, of a rocker-arm for reciprocating said stapling-devices, a pivot-bearing for the rocker-arm, an eccentric bearing for adjusting the vertical position of the pivot-bearing, a crank-arm for turning said bearing, a quadrant for the crank-arm, and means to lock the crank-arm in adjusted position on the quadrant.

35. In a wire-stitching or stapling machine, the combination with the reciprocable stapling-devices, of a rocker-arm for actuating said devices, a pivot-bearing for the rocker-arm, an eccentrically-mounted shaft for supporting said bearing to adapt it to be adjusted in vertical position, a manually-operable crank-arm for turning the shaft, a quadrant for the crank-arm, and means to bind the arm against the quadrant to hold the bearing in its adjusted position.

36. In a wire-stitching or stapling machine, the combination with the reciprocable stapling-devices, of a rocker-arm for actuating said devices, a pivot-bearing for the rocker-arm, an eccentrically-mounted shaft for supporting the pivot-bearing, a crank-arm for turning the shaft, a quadrant for the crank-arm, and a set-screw in the crank-arm adapted to be set against the quadrant to hold the crank-arm in adjusted position thereon.

In testimony whereof I affix my signature.

ARTHUR H. MAYNARD.